(12) United States Patent
Adkins et al.

(10) Patent No.: US 8,521,690 B2
(45) Date of Patent: *Aug. 27, 2013

(54) USING A SPARSE FILE AS A CLONE OF A FILE

(75) Inventors: Janet E. Adkins, Austin, TX (US); Joon Chang, Austin, TX (US); Manoj N. Kumar, Austin, TX (US); Grover H. Neuman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/450,012

(22) Filed: Apr. 18, 2012

(65) Prior Publication Data

US 2012/0209810 A1 Aug. 16, 2012

Related U.S. Application Data

(63) Continuation of application No. 12/414,870, filed on Mar. 31, 2009, now Pat. No. 8,195,611.

(51) Int. Cl.
*G06F 7/00* (2006.01)
*G06F 17/00* (2006.01)

(52) U.S. Cl.
USPC .......................................................... 707/639

(58) Field of Classification Search
USPC .......................................................... 707/639
See application file for complete search history.

(56) References Cited

U.S. PATENT DOCUMENTS

| | | | |
|---|---|---|---|
| 5,761,678 A | 6/1998 | Bendert et al. | |
| 5,963,962 A * | 10/1999 | Hitz et al. | 1/1 |
| 7,194,595 B1 | 3/2007 | Fair et al. | |
| 7,321,962 B1 | 1/2008 | Fair et al. | |
| 7,334,094 B2 | 2/2008 | Fair | |
| 7,334,095 B1 * | 2/2008 | Fair et al. | 711/161 |
| 7,409,511 B2 | 8/2008 | Edwards et al. | |
| 7,702,683 B1 * | 4/2010 | Kirshenbaum | 707/758 |
| 7,757,056 B1 * | 7/2010 | Fair | 711/162 |
| 7,984,452 B2 | 7/2011 | Chakravarty et al. | |
| 2005/0246397 A1 * | 11/2005 | Edwards et al. | 707/204 |
| 2007/0162515 A1 | 7/2007 | Sarma et al. | |
| 2008/0114756 A1 * | 5/2008 | Konig et al. | 707/5 |
| 2008/0294696 A1 * | 11/2008 | Frandzel | 707/200 |
| 2010/0250493 A1 | 9/2010 | Adkins et al. | |

OTHER PUBLICATIONS

Bik, Aart J. et al., "The Automatic Generation of Sparse Primitives", ACM Transactions on Mathematical Software, vol. 24, No. 2, Jun. 1998, pp. 190-225.

(Continued)

*Primary Examiner* — Shyue Jiunn Hwa
*Assistant Examiner* — Muluemebet Gurmu
(74) *Attorney, Agent, or Firm* — Francis Lammes; Stephen J. Walder, Jr.; John D. Flynn (57) ABSTRACT

One embodiment is for using a sparse file as a clone. The method includes creating, by an application associated with a computer system, a snapshot of a file, such as an individual file, a collection of files, file system, directories, and so forth. Further, the method includes requesting, by the application, a clone of that created snapshot. Further still, the method includes generating, by the application, an empty sparse having at least one inode identifying the empty sparse file as the clone and pointing to the snapshot associated with the clone. Thereby, the requested clone is created using the created sparse file, which begins as an empty sparse file.

14 Claims, 5 Drawing Sheets

(56) References Cited

OTHER PUBLICATIONS

Meyer, Dutch T. et al., "Parallax: Virtual Disks for Virtual Machines", EuroSys'08, Glasgow, Scotland, UK, Apr. 1-4, 2008, pp. 41-54.

Spillane, Richard P. et al., "Rapid File System Development Using ptrace", ExpCS, San Diego, California, Jun. 13-14, 2007, pp. 1-13.
USPTO U.S. Appl. No. 12/414,870, Apr. 16, 2012, 2 pages.

\* cited by examiner

USING A SPARSE FILE AS A CLONE OF A FILE

This application is a continuation of application Ser. No. 12/414,870, filed Mar. 31, 2009, status allowed.

BACKGROUND

Users, such as administrators, operators and developers, desire to modify, e.g., update, one or more files.

BRIEF SUMMARY

Embodiments of this disclosure generally provide methods, systems, and media for using a sparse file as a clone. One embodiment of the method includes creating, by an application associated with a computer system having at least a processor, a snapshot of a file. Further, the method includes requesting, by the application, a clone of that created snapshot. Further still, the method includes generating, by the application, an empty sparse file, having at least one inode identifying the empty sparse file as the clone and pointing to the snapshot associated with the clone. Thereby, the requested clone is created using the created sparse file that begins as an empty sparse file.

In another embodiment, this disclosure provides a system for using a sparse file as a clone. The system includes at least one computer system having a processor. Further, the system includes a creation module, in association with an application and at least one computer system, for creating a snapshot of a file. Further still, the system includes a request module, in association with the creation module, for requesting a clone of that snapshot. Yet further, the system includes a generation module, in association with the request module, for generating an empty sparse file, having at least one inode identifying the empty sparse file as the clone and pointing to the snapshot associated with the clone. Then, the clone is created using the created sparse file that begins as an empty sparse file.

In yet another embodiment, this disclosure provides a computer program product for using a sparse file as a clone. The computer program product includes a computer usable medium having computer usable program code embodied therewith. The computer usable program code includes code configured to create a snapshot of a file and request a clone of that snapshot. Further, the computer usable program code includes code configured to generate an empty sparse file, having at least one inode to identify the empty sparse file as the clone and to point to the snapshot associated with the clone. Thereby, the clone is created using the sparse file that begins as an empty sparse file.

BRIEF DESCRIPTION OF THE SEVERAL VIEWS OF THE DRAWINGS

So that the manner in which the above recited features, advantages and objects of the present disclosure are attained and can be understood in detail, a more particular description of this disclosure, briefly summarized above, may be had by reference to the embodiments thereof which are illustrated in the appended drawings.

It is to be noted, however, that the appended drawings illustrate only typical embodiments of this disclosure and are therefore not to be considered limiting of its scope, for this disclosure may admit to other equally effective embodiments.

DETAILED DESCRIPTION OF THE INVENTION

The following is a detailed description of example embodiments of this disclosure depicted in the accompanying drawings. The embodiments are examples and are in such detail as to clearly communicate this disclosure. However, the amount of detail offered is not intended to limit the anticipated variations of embodiments; on the contrary, the intention is to cover all modifications, equivalents, and alternatives falling within the spirit and scope of the present disclosure as may be defined by the appended claims. The detailed descriptions below are designed to make such embodiments obvious to a person of ordinary skill in the art.

Generally speaking, methods, systems and computer program products for using a sparse file as a clone are contemplated. A user, whether an automated computer action or a person such as a developer, may create a snapshot of a file, wherein the snapshot is a point-in-time image of a file(s), e.g., one or more files, file systems, directories, etc. Subsequently, a user may request creation of a clone of the snapshot of the selected file(s), and from an underneath perspective, the kernel, for instance, of a computer system may generate an empty sparse file as the clone at the behest of an application having logic reduced to hardware and/or software to enable the functionalities disclosed herein. As part of this generating, the empty sparse file has at least one inode identifying the empty sparse file as a clone and pointing to the above-mentioned, created snapshot. Thereafter, a user may read from or write to the clone in an isolated manner; that is, the read may occur without affecting the user's environment or other's environment if shared or otherwise accessible by the user. The logical offsets in a clone correspond to physical/logical offsets in the file to which the clone is backed. Reading of any unbacked data in the clone is routed to read from the equivalent block, i.e., physical/logical offsets, in the snapshot of the file. Writing to the clone writes to the physical/logical offsets in fillable sparse file, whereupon the foregoing permits a later read of the clone to read the newly written data in the clone instead of the kernel reading from the snapshot of the file because the holes in the clone have now been filled with newly written data. Stated another way, as a result of writing into the clone at the particular logical offset, the inode(s) will not point the kernel to read from snapshot of the file because the holes in the non-empty, sparse file have been filled with newly written data. As a result, the writings, i.e., modifications, such as the updating of an operating system, to the clone may safely and optionally be rolled out as a new, tested and working environment.

Before further discussion of this disclosure, a brief retreat to "sparse files" seems warranted. A "sparse file" is a type of computer file that uses a file system space more efficiently when blocks allocated to the file are mostly empty. Efficiency is achieved by writing brief information, e.g., metadata, representing the empty blocks to disk instead of the actual "empty" space, which makes up the block, and using less disk space. (Nonetheless, in this disclosure, the term "empty sparse file" is understood to mean the sparse file at the point of creation of the clone; that is, for instance, before any writing in order to modify the clone.) The full block size may be written to a disk as the actual size only when the block contains "real", i.e., non-empty, data. When sparse files are read, the file system transparently converts the metadata representing empty blocks into "real" blocks filled with zero bytes at runtime. However, a user or the utilizing application is unaware of this transparent conversion. Most modern file systems support sparse files, including, for example, UNIX, Linux, AIX JFS, AIX JFS2, SUN's file systems, and Veritas' file systems. In this disclosure, sparse files are used for clone (s) of snapshot(s) of file system(s).

Figure 1:
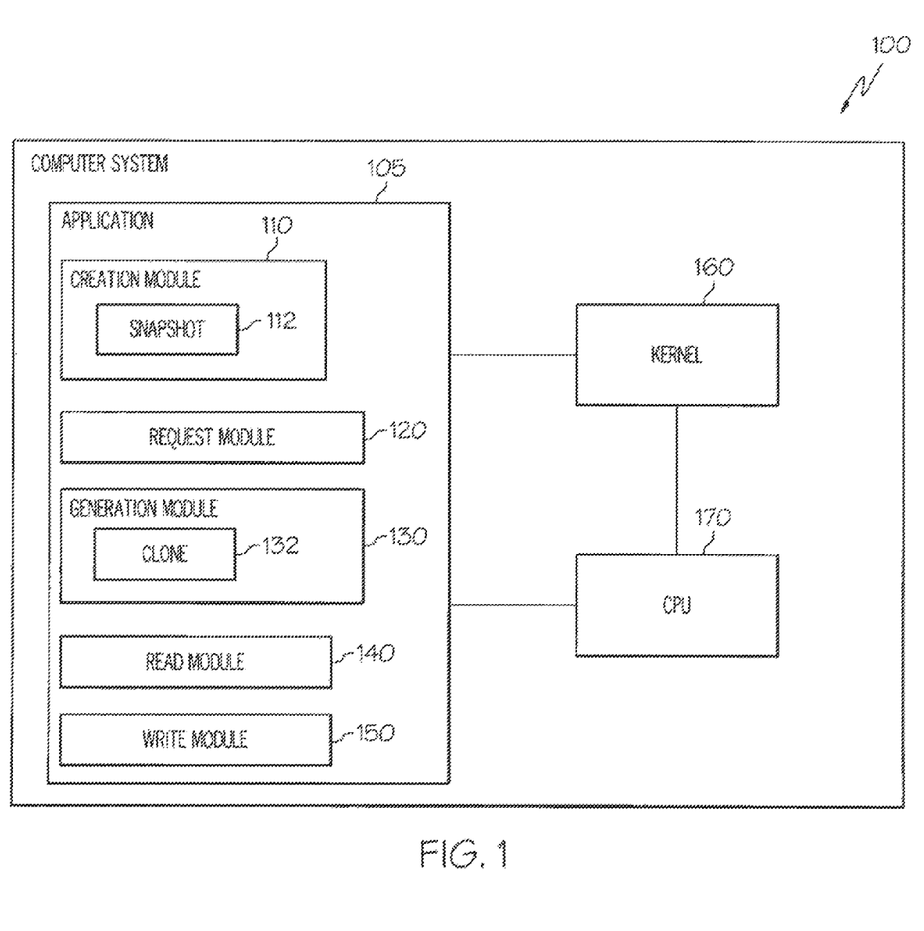
FIG. 1 depicts an example embodiment of a system for using a sparse file as a clone in accordance with this disclosure.

Turning now to the drawings, FIG. 1 depicts an example embodiment of a computer system 100 for using a sparse file as a clone as well as reading and writing thereto. Although computer system 100 is depicted as a single computer system, it 100 may be one or more computer systems in non-depicted wired or wireless network connection, such as wireless network connection, which, for example, may occur through Bluetooth™, IRDA, LAN or WAN.

The application 105, itself, may actually be one or more applications as well as one or more locations on one or more communicating computer systems, such as computer system 100. The application 105, enabled for logic reduced to software and/or hardware, permits the sparse file handling and all functionality discussed herein by a kernel, for example, and, to that effect, may be simply a modification of any application (s) for sparse file handling. The enabling logic is realized, at least in part, by the application's 105 modules 110, 120, 130, 140, and 150, wherever such modules may reside within the system 100, and permit using a sparse file as a clone, as well as reading therefrom and writing thereto, through the computer system's 105 one or more non-depicted logical and/or physical peripherals, such as a mouse, printer, keyboard, screen, and storage, such as a database, RAM or ROM.

Discussing FIG. 1 in more detail, the application 105 in the example embodiment includes a creation module 110. The creation module 110, enabled by logic reduced to hardware and/or software, permits a user to create a snapshot 112 of a file. A snapshot 112 of a file is a read-only, point-in-time image of the file(s), wherein the file(s), itself, is data, e.g., files, file systems, directories, etc.; basically, the file(s) is any file reachable by the computer system 100. Creation of a snapshot 112 may be accomplished by an application's 105 creation module 110 that has logic permitting execution of a command to create a snapshot 112 of a file. For example, the application's 105 logic may permit received command line entry for creating a snapshot 112 or have the command executed through icons, drop-down menus, radio button, check boxes, and so forth provided to a user on a graphical user interface for selecting related choices, e.g., file name, storage location, etc., in order to create a snapshot 112. The received command line entry, for instance, may be received by a user of the computer system entering a one or more commands or selecting an icon, and, instead of a natural person, the received command entry may, instead, be performed by an automated means, such as by the same or another computer system.

Subsequent to creating the snapshot 112, the application's 105 request module 120, for instance, may, permit the user to create a clone 132 of the snapshot 112. As in the preceding paragraph, the request module 120 may have logic permitting received command line entry, such as the previously discussed manner of receiving in the preceding paragraph, for requesting the creation of a clone 132 or have the command executed through icons, drop-down menus, radio button, check boxes, and so forth provided to a user on a graphical user interface for selecting related choices, e.g., file name of clone, clone of what file(s), storage location(s), etc., in order to request the creation of the clone 132. From a user's perspective, a clone 132 may appear to be simply a writable snapshot 112, but that is not the actual case in this disclosure.

Moving now to an underneath perspective, at the behest of the application's 105 logic, such as code reduced to software and/or hardware, the kernel 160 may be instructed to create the user-requested clone 132, for example, through the application's 105 generation module 130. The CPU 170 is in communication with the kernel 160 of the operating system for the computer system 100. The kernel 160 is the core of an operating system, and is what controls the processes on a computer system 100, what handles the memory being swapped in and out, and what drives the hardware of the computer system 100 to launch applications, e.g., 105. Through enabling logic, the generation module 130 may generate an "empty sparse file" as the clone 132, wherein the empty sparse file has at least one inode identifying the empty sparse file as the clone 132 and pointing to the snapshot 112 associated with the clone 132. The generated inode(s) are data structures containing file information upon file creation that may contain and store the foregoing identifying and pointing, as well as have information about user and group ownership, security, access mode (read, write, execute permissions), and so forth. As a result of the generation module, clone 132, at its creation by the application 105 through the kernel 150, is a sparse file that is an empty sparse file—a file that has no blocks backed to this file yet—until a user, whether automated or real, reads therefrom or writes thereto.

Figure 2:
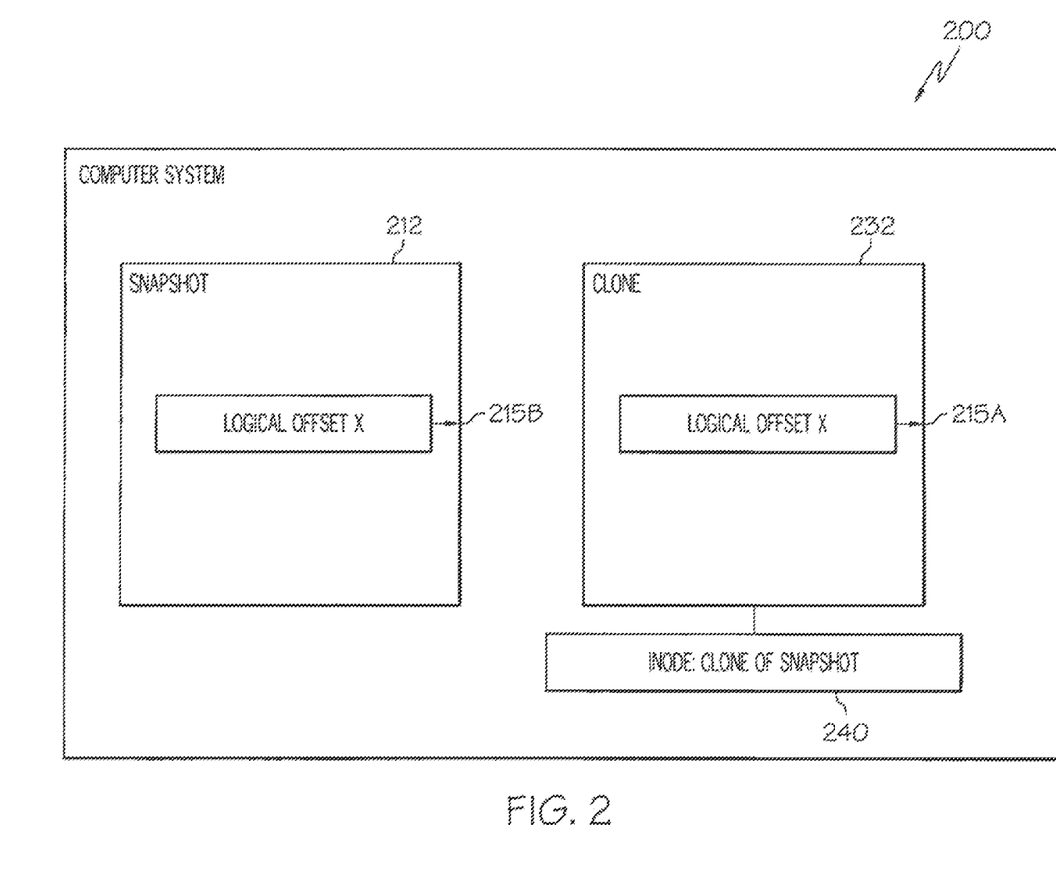
FIG. 2 depicts an example embodiment of a block diagram where an arbitrary logical offset, denominated X, of a snapshot of a file that is read from and/or written to a clone of that snapshot in accordance with this disclosure.

Further enabling logic associated with the application 105 permits reading and/or writing to the clone 132. Logic associated with the read module 140 permits reading from the clone 132, which may be from the clone 132 directly or from the clone 132 indirectly via the snapshot 112 as further explained. Additional logic of the read module 140 permits any read of unbacked block of data in the clone 132 to be routed, through the aforementioned inode, to read from the equivalent block of data in the snapshot 112. The preceding sentence is depicted by FIG. 2. Here, imagine there is nothing for the application's read module to read at logical offset X 215A in the clone 232. The generated inode(s) 240 tell the kernel to go read logical offset X 215B in the snapshot 212 and present this data, logical offset X 215B, for the clone's 232 reading of logical offset X 215A. As a result, this permitted block mapping shows reading from the clone 232 indirectly via the snapshot 212, whereas, otherwise, the reading of the clone 232 is direct if there is data in the other logical offsets of the clone 232.

Operating in tandem with the read module 140, the write module's 150 logic permits writing, such as through command line entry or graphical user interface(s), modifications to the generated clone 132. Example modifications enabled by logic include updating operating systems or other applications, testing changes to computer programs, or otherwise safely trying out other changes for the snapshot 112 through means of use of a clone 132. The write module's 150 logic permits writing to the clone at the logical offset of a physical block of data so that a later read of the clone 132 is different than the snapshot 112 if the modification(s) are not implemented. Stated another way, a later read of the clone 132 reads the modified data in the clone 132 instead of being inode-referred to read from the snapshot 112 because the holes in the clone 132 for the physical block of data are filled now with the modified data. Accordingly, reference to FIG. 2 is again possible for explaining the write module's writing, but the explanation is different. In computer system 200, if logical offset X 215A of the clone 232 has modified data therein 215A, then the inode 240 will not tell the clone 232 to read the equivalent logical offset X 215B in the snapshot and will not present this data, logical offset X 215B, for the clone's 232 reading of logical offset X 215A because the write module 150 has permitted data written at logical offset X 215B. If the written modifications to the clone show successful testing results, then the modifications in the clone 232 may be rolled out to become the new environment for the user and/or the entire community sharing the computer system 200 or other computer systems.

Figure 3:
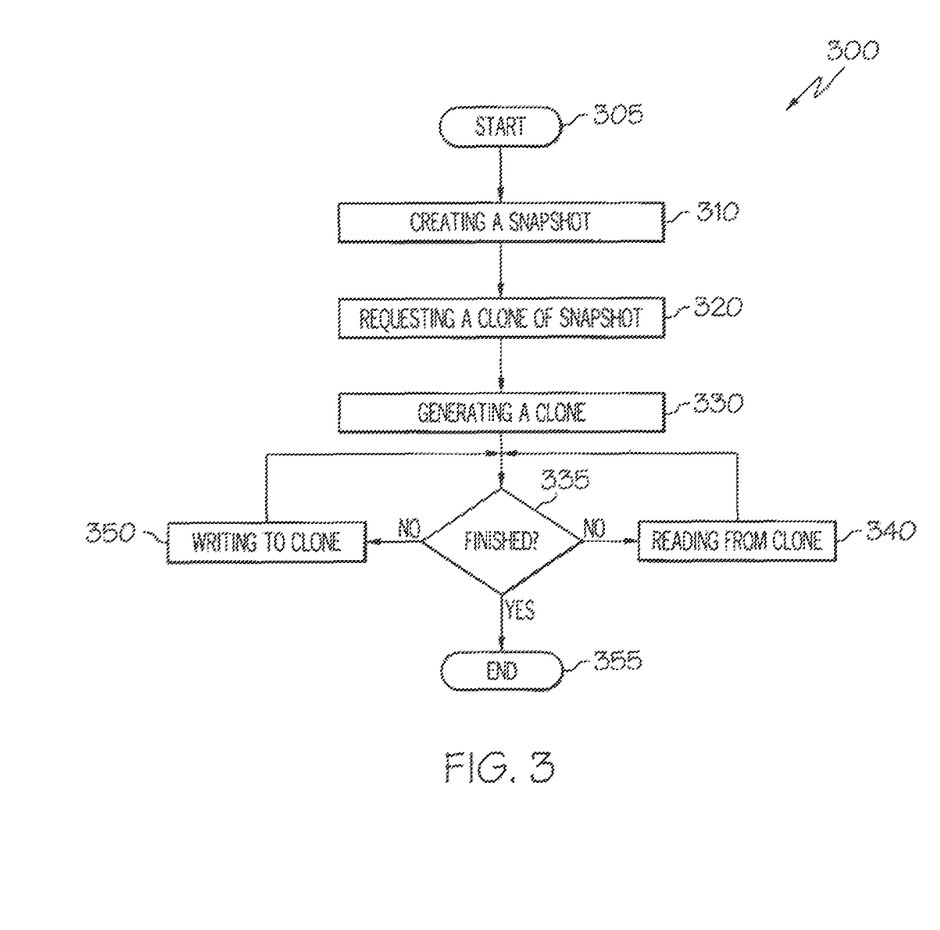
FIG. 3 depicts an example embodiment of a flowchart to show a method for using a sparse file as a clone in accordance with this disclosure.

Turning now to FIG. 3, another aspect of the disclosure is disclosed. In particular, an embodiment of a flowchart 300 of a method for using a sparse file as a clone of a file(s) is depicted. Flowchart 300 is for a system, such as systems 100 and 200, as shown in FIGS. 1 and 2, respectively. Enabling logic reduced to hardware and/or software within an application available on one or more associated computer systems permit the functionality discussed herein and in the example embodiment depicted by FIG. 3.

Flowchart 300 starts 305 by a user, such as previously described herein, creating 310 a snapshot of a file(s) using one or more applications through, for example, graphical user interface(s) and/or command entry line(s) associated with the computer system(s). Subsequently or concurrently with creating 310, a user requests 320 a clone of the snapshot. Based on the requesting 320, one or more applications, or functional parts thereof, may instruct the kernel to generate 330 the clone, which is an empty sparse file having inode(s) identifying the empty sparse file as a clone of the snapshot and pointing to the snapshot of the file, itself. The flowchart 300 then depicts a decision block querying whether the user is finished 335. Such an optional query 335 could be presented to the user on a display associated with the one or more applications of the computer system(s). If the answer to decision block 335 is yes, i.e., there is no reading 340 from the clone or writing 350 to the clone, then the flowchart 300 ends 355. Until the answer to decision block 335 is yes, however, there are optional, but not necessarily exclusionary alternatives depicted in the flowchart 300. For one, the flowchart 300 shows reading 340 from the clone, whereby the kernel reads 340 at least one inode associated with the clone for reading 340 an equivalent logical offset in the snapshot and presenting it to the user seamlessly; otherwise, the reading 340 occurs directly from the clone. If there is no more reading 340, then the flowchart 300 ends 355. Regarding writing 350 to the clone, a user writes 350, i.e., modifies, data to a logical offset of a physical block of data so that a later read 340 of the clone is different than the snapshot if the modification(s) are implemented, i.e., accepted by a user. In this manner, the written data to the logical offset will not cause the kernel to read from the equivalent block of data in snapshot because the hole where the data was written in the sparse file is filled; thus, the inode(s) do not function to read 340 the logical offset from the snapshot for the clone in this instance. If there is no more reading 350, then the flowchart 300 ends 355.

Figure 4:
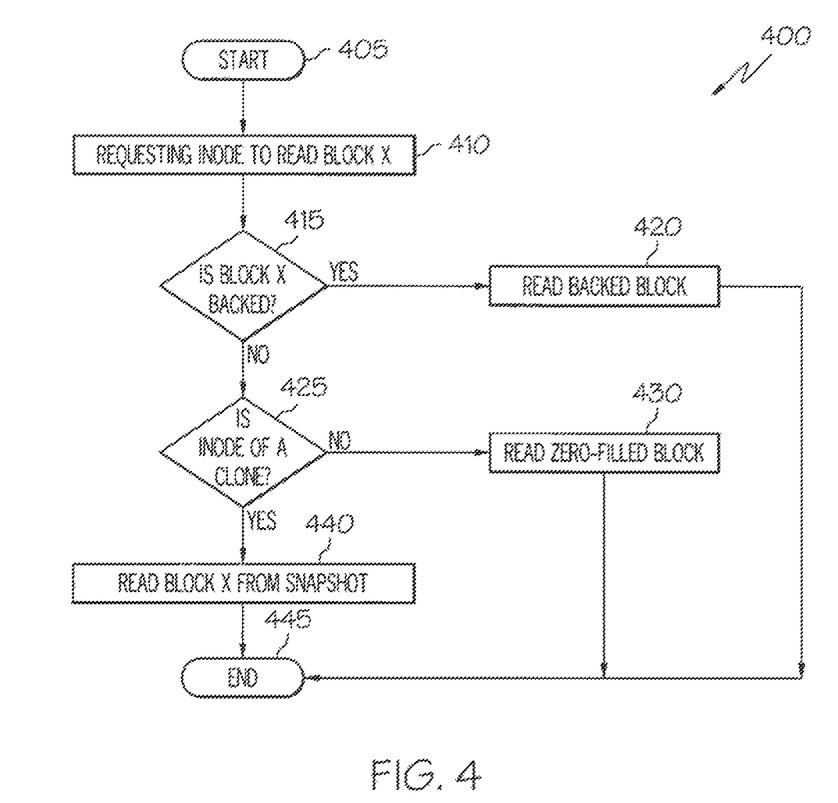
FIG. 4 depicts an example embodiment of a flowchart to show a method for reading a sparse file in accordance with this disclosure.

Turning now to FIG. 4, another aspect of the disclosure is disclosed. In particular, an embodiment of a flowchart 400 of a method for a kernel, for instance, at the behest of the application to read a sparse file is depicted. Flowchart 400 is for a system, such as systems 100 and 200, as shown in FIGS. 1 and 2, respectively, as well as the methods shown in FIG. 3 by its flowchart 300. Enabling logic reduced to hardware and/or software within an application available on one or more associated computer systems permit the functionality discussed herein and in the example embodiment depicted by FIG. 4.

Flowchart 400 starts 405 by a kernel requesting 410 an inode to read block X of data in a file. The exemplified read of sparse file flowchart 400 depicts a decision block 415 querying 415 whether the particular block, here, denominated as block X, in the file is backed. If block X is backed, then the inode reads 420 the backed block data. Alternatively, if block X is not backed to a disk, other type of memory or the like, then the flowchart 400 depicts a decision block 425 querying if the inode is of a clone, whereby the inode may point to another file, e.g., a snapshot of a file. If the answer to decision block 425 is no, then the flowchart 400 shows reading 430 zero-filled blocks of data, whereupon the flowchart 400 ends 445. In the alternative, if the answer to decision block 425 is yes, then the kernel reads block X from the snapshot, such as previously discussed in regards to FIG. 2. The flowchart 440 then ends 445.

Figure 5:
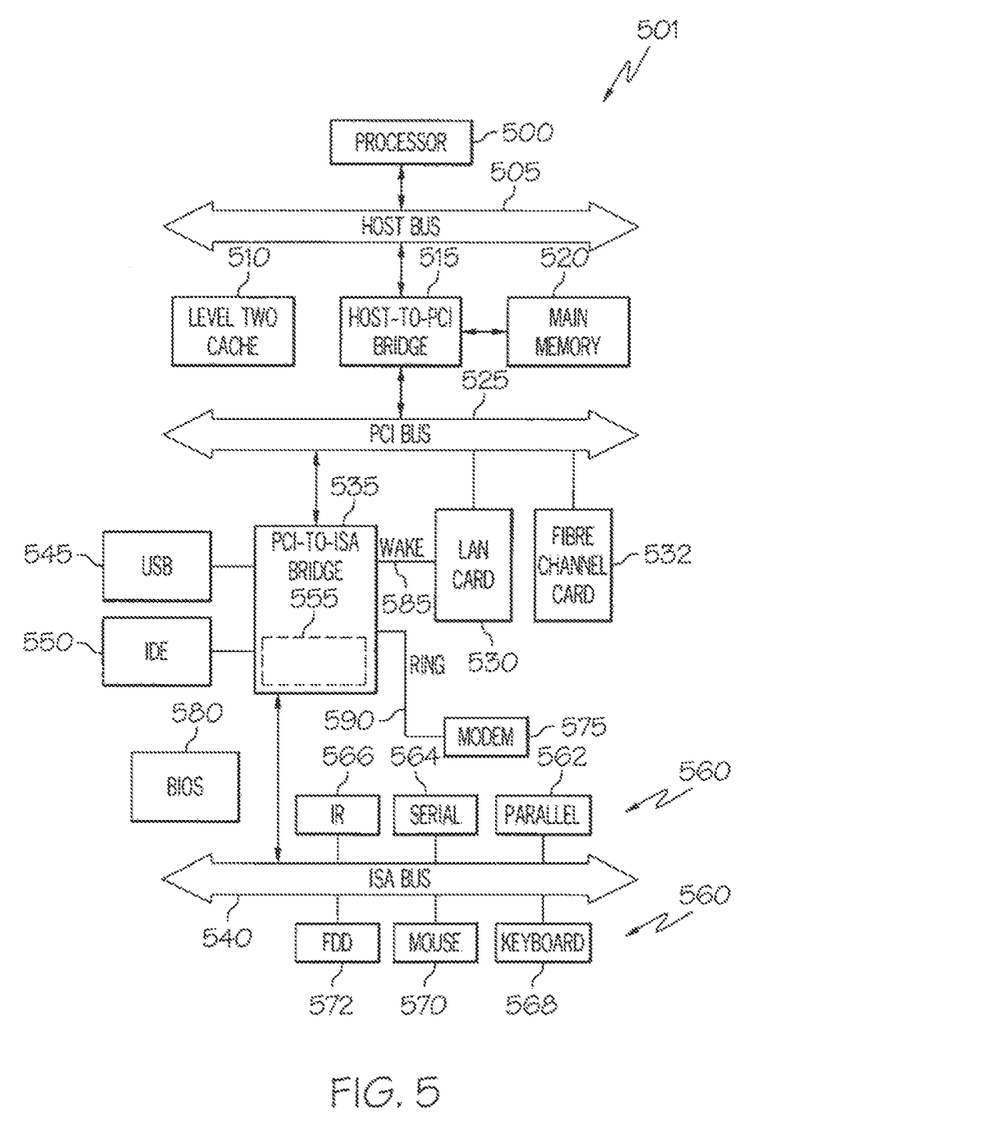
FIG. 5 depicts a computer system capable of use in accordance with this disclosure.

FIG. 5 illustrates information handling system 501 which is a simplified example of a computer system, such as shown in FIG. 1 for using a sparse file as a clone, and capable of performing the operations described herein. Computer system 501 includes processor 500 which is coupled to host bus 505. A level two (L2) cache memory 510 is also coupled to the host bus 505. Host-to-PCI bridge 515 is coupled to main memory 520, includes cache memory and main memory control functions, and provides bus control to handle transfers among PCI bus 525, processor 500, L2 cache 510, main memory 520, and host bus 505. PCI bus 525 provides an interface for a variety of devices including, for example, LAN card 530. PCI-to-ISA bridge 535 provides bus control to handle transfers between PCI bus 525 and ISA bus 540, universal serial bus (USB) functionality 545, IDE device functionality 550, power management functionality 555, and can include other functional elements not shown, such as a real-time clock (RTC), DMA control, interrupt support, and system management bus support. Peripheral devices and input/output (I/O) devices may be attached to various interfaces 560 (e.g., parallel interface 562, serial interface 564, infrared (IR) interface 566, keyboard interface 568, mouse interface 570, fixed disk (HDD) 572, and non-depicted removable storage device(s)) coupled to ISA bus 540. Alternatively, many I/O devices can be accommodated by a super I/O controller (not shown) attached to ISA bus 540.

BIOS 580 is coupled to ISA bus 540, and incorporates the necessary processor executable code for a variety of low-level system functions and system boot functions. BIOS 580 can be stored in any computer-readable storage medium, including magnetic storage media, optical storage media, flash memory, random access memory, read only memory, and so forth. In order to attach computer system 501 to another computer system to copy files over a network, LAN card 530 is coupled to PCI bus 525 and to PCI-to-ISA bridge 535. Similarly, to connect computer system 501 to an ISP to connect to the Internet using a telephone line connection, modem 575 is connected to serial port 564 and PCI-to-ISA Bridge 535. Although not depicted, computer system 501 may be, and likely is, connected to one or more view screens or other displays for users to see their optional interaction with computer system 501.

While the computer system described in FIG. 5 is capable of executing the disclosure described herein, this computer system is simply one example of a computer system. Those skilled in the art will appreciate that many other computer system designs are capable of performing the disclosure described herein.

Another embodiment of the disclosure is implemented as a program product for use within a device such as, for example, those systems and methods depicted in FIGS. 1-4. The program(s) of the program product defines functions of the embodiments (including the methods described herein) and can be contained on a variety of data-bearing media. Illustrative data-bearing media include, but are not limited to: (i) information permanently stored on non-writable storage-type accessible media (e.g., read-only memory devices within a computer such as CD-ROM disks readable by a CD-ROM drive); (ii) alterable information stored on writable storage-type accessible media (e.g., floppy disks within a diskette drive or hard-disk drive); and (iii) information conveyed to a computer by a communications medium, such as through a computer or telephone network, including wireless communications. The latter embodiment specifically includes information downloaded onto either permanent or even sheer momentary storage-type accessible media from the World Wide Web, an interne, and/or other networks, such as those known, discussed and/or explicitly referred to herein. Such data-bearing media, when carrying computer-readable instructions that direct the functions of the present disclosure, represent embodiments of the present disclosure.

In general, the routines executed to implement the embodiments of this disclosure, may be part of an operating system or a specific application, component, program, module, object, or sequence of instructions. The computer program of this disclosure typically comprises a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of this disclosure. However, it should be appreciated that any particular program nomenclature that follows is used merely for convenience, and thus this disclosure should not be limited to use solely in any specific application identified and/or implied by such nomenclature.

While the foregoing is directed to example embodiments of this disclosure, other and further embodiments of this disclosure may be devised without departing from the basic scope thereof, and the scope thereof is determined by the claims that follow.

What is claimed is:

1. A method for using a sparse file as a clone, the method comprising:
   creating, by an application, a snapshot of a file, wherein the application is associated with a computer having a processor;
   requesting, by the application, the clone of the snapshot;
   generating, by the application, an empty sparse file, having at least one inode identifying the empty sparse file as the clone and pointing to the snapshot associated with the clone;
   whereby, the clone is created using the sparse file that begins as the empty sparse file; and
   reading data from the clone, wherein the reading from the clone comprises reading from the snapshot for unbacked data in the sparse file, whereby the snapshot presents the unbacked data to the clone and wherein reading from the snapshot for the unbacked data in the sparse file further comprises:
   responsive to a read of data at a logical offset location in the sparse file of the clone resulting in an indication that modified data exists at the logical offset location in the sparse file of the clone, scanning the at least one inode for the logical offset location in the snapshot where the data is located; and
   responsive to the scan of the at least one inode for the logical offset location verifying that the data at the logical offset location in the sparse file of the clone has been modified, preventing a read of the unbacked data from the snapshot.

2. The method of claim 1, further comprising writing data to the clone.

3. The method of claim 2, wherein the writing to the done comprises modifying the sparse file, whereby, a later read of the clone is different than a read of the snapshot for an unimplemented modification.

4. The method of claim 1, wherein the creating comprises executing at least one command for the requesting the done of the snapshot.

5. The method of claim 1, wherein the requesting comprises executing at least one command for the requesting the done of the snapshot.

6. A system for using a sparse file as a clone, the system comprising:
   at least one computer system having a processor;
   a creation module, in association with the at least one computer system, for creating a snapshot of a file;
   a request module, in association with the creation module, for requesting the clone of the snapshot;
   a generation module, in association with the request module, for generating an empty sparse file, having at least one inode identifying the empty sparse file as the clone and pointing to the snapshot associated with the clone;
   whereby, the clone is created using the sparse file beginning as the empty sparse file; and
   a read module, in association with the at least one computer system, for reading data from the clone, wherein the read module for reading from the clone comprises logic for reading from the snapshot for unbacked data in the sparse file, whereby the snapshot presents the unbacked data to the clone and wherein reading from the snapshot for the unbacked data in the sparse file further comprises logic for:
   responsive to a read of data at a logical offset location in the sparse file of the clone resulting in an indication that modified data exists at the logical offset location in the sparse file of the clone, scanning the at least one inode for the logical offset location in the snapshot where the data is located; and
   responsive to the scan of the at least one inode for the logical offset location verifying that the data at the logical offset location in the sparse file of the clone has been modified, preventing a read of the unbacked data from the snapshot.

7. The system of claim 6, further comprising a writing module for writing, in association with the at least one computer system, data to the clone.

8. The system of claim 7, wherein the write module for the writing to the clone comprises logic for modifying the sparse file, whereby, a later read of the clone is different than a read of the snapshot for an unimplemented modification.

9. The system of claim 6, wherein the creation module comprises creating the snapshot of the file based upon execution of at least one received command.

10. The system of claim 6, wherein the request module comprises requesting the clone of the snapshot based upon execution of at least one received command.

11. A computer program product for using a sparse file as a clone, the computer program product comprising:

a computer readable storage medium having computer usable program code stored thereon, the computer usable program code comprising:

the computer usable program code configured to:

create, by an application, a snapshot of a file, wherein the application is associated with a computer having a processor;

request, by the application, the clone of the snapshot;

generate, by the application, an empty sparse file, having at least one inode identifying the empty sparse file as the clone and pointing to the snapshot associated with the clone;

whereby, the clone is created using the sparse file that begins as the empty sparse file; and read data from the clone, wherein the computer usable program code configured to read from the clone comprises the code configured to read from the snapshot for unbacked data in the sparse file, whereby the snapshot presents the unbacked data to the clone and wherein the computer usable program code configured to read from the snapshot for the unbacked data in the sparse file is further configured to:

responsive to a read of data at a logical offset location in the sparse file of the clone resulting in an indication that modified data exists at the logical offset location in the sparse file of the clone, scanning the at least one inode for the logical offset location in the snapshot where the data is located; and responsive to the scan of the at least one inode for the logical offset location verifying that the data at the logical offset location in the sparse file of the clone has been modified, preventing a read of the unbacked data from the snapshot.

12. The computer program product of claim 11, wherein the computer usable program code further comprises the code configured to write data to the clone.

13. The computer program product of claim 12, wherein the computer usable program code configured to write to the clone comprises the code configured to modify the sparse file, whereby, a later read of the clone is different than a read of the snapshot for an unimplemented modification.

14. The computer program product of claim 11, wherein the computer usable program code configured to request comprises the code configured to execute at least one received command to request the clone of the snapshot.

* * * * *